United States Patent [19]
Pennucci

[11] 3,735,671
[45] May 29, 1973

[54] HYDRAULIC POWER MODULE

[76] Inventor: Frank P. Pennucci, 4165 La Laders Road, Santa Barbara, Calif. 93105

[22] Filed: July 12, 1971

[21] Appl. No.: 161,686

[52] U.S. Cl....................................................92/90
[51] Int. Cl............................F01b 19/00, F16j 3/00
[58] Field of Search......................92/92, 91, 89, 90, 92/94

[56] References Cited

UNITED STATES PATENTS

| | | | |
|---|---|---|---|
| 2,976,888 | 3/1961 | Merriman | 92/90 X |
| 3,016,884 | 1/1962 | Merriman | 92/90 X |
| 3,084,961 | 4/1963 | Merriman | 92/92 X |
| 2,467,883 | 4/1949 | Edwards, Jr. | 92/92 |
| 3,033,143 | 5/1962 | Grankowski | 92/92 |

Primary Examiner—Martin P. Schwadron
Assistant Examiner—A. Hershkovitz
Attorney—Alfred W. Barber

[57] ABSTRACT

Two or more high pressure hoses are stacked and constrained to provide a substantially unidirectional force by means of a floating spacer. The hoses are totally enclosed and operated between two predetermined contours by means of high pressure hydraulic fluid.

6 Claims, 4 Drawing Figures

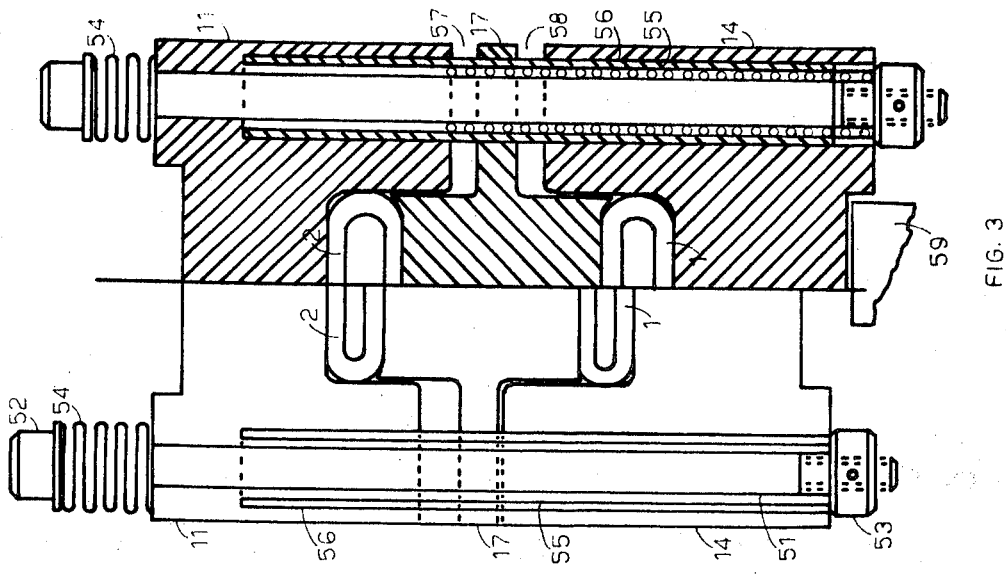
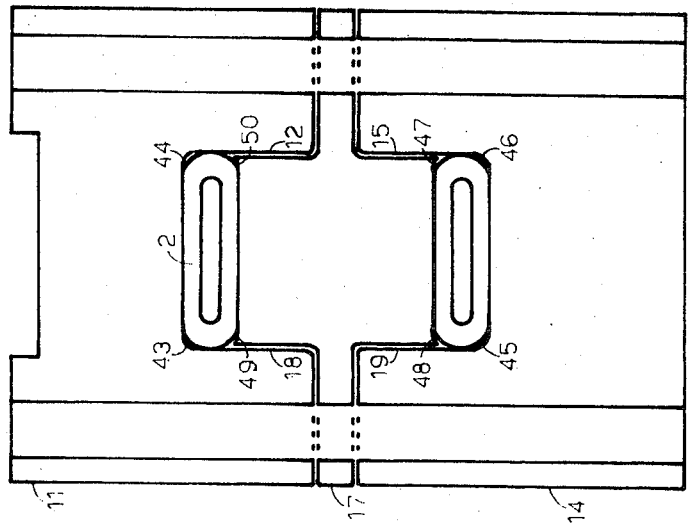

PATENTED MAY 29 1973

INVENTOR.
FRANK P. PENNUCCI

BY

*Alfred W. Barber*

ATTORNEY

HYDRAULIC POWER MODULE

Many machine operations require extremely high forces. In the past these forces have been produced in a number of ways. For example, huge flywheels have been provided to store energy which is then released to operate power shears or brakes; another means uses huge hydraulically operated pistons. Such machines in the past have been very large, rather cumbersome and generally very expensive to build and operate.

SUMMARY

I have found, in accordance with my prevent invention, how to use a high pressure hose to provide very high and unidirectional forces inexpensively and efficiently. By mounting two high pressure hoses in constraining channels and end stops and by adding and unidirectionalizing the forces from the two hoses by a guided floating spacer I have found how to provide a hydraulic motor of very superior characteristics. The constraining channels and guided floating spacer allowed to move a power actuator between two predetermined positions results in operating the hose between two predetermined contours both of which are partly inflated conditions. The proscribed conditions result in operating the hose in a very long life mode. Any tendency to elongate is prevented by end stops. The hoses are provided with round fittings at each end so that the hydraulic fluid has free through passage. Since the hoses are relatively small, say 1.25 inch inside diameter and length only for the machine to be used on, the amount of hydraulic fluid required is comparatively very small. Since the force is unidirectional, the motor is very efficient by comparison with prior art devices. The constraining channels and the stabilizing floating spacer are shaped so that the contour of the hose is free from sharp changes. The hose comes in contact with no sharp edges which could produce high stressing.

In the Drawing:

FIG. 2 is a simplified end view of the assembled device.

FIG. 3 is a composite view including a cross sectional view of the hydraulic motor of the present invention showing contracted and expanded positions.

Figure 1:
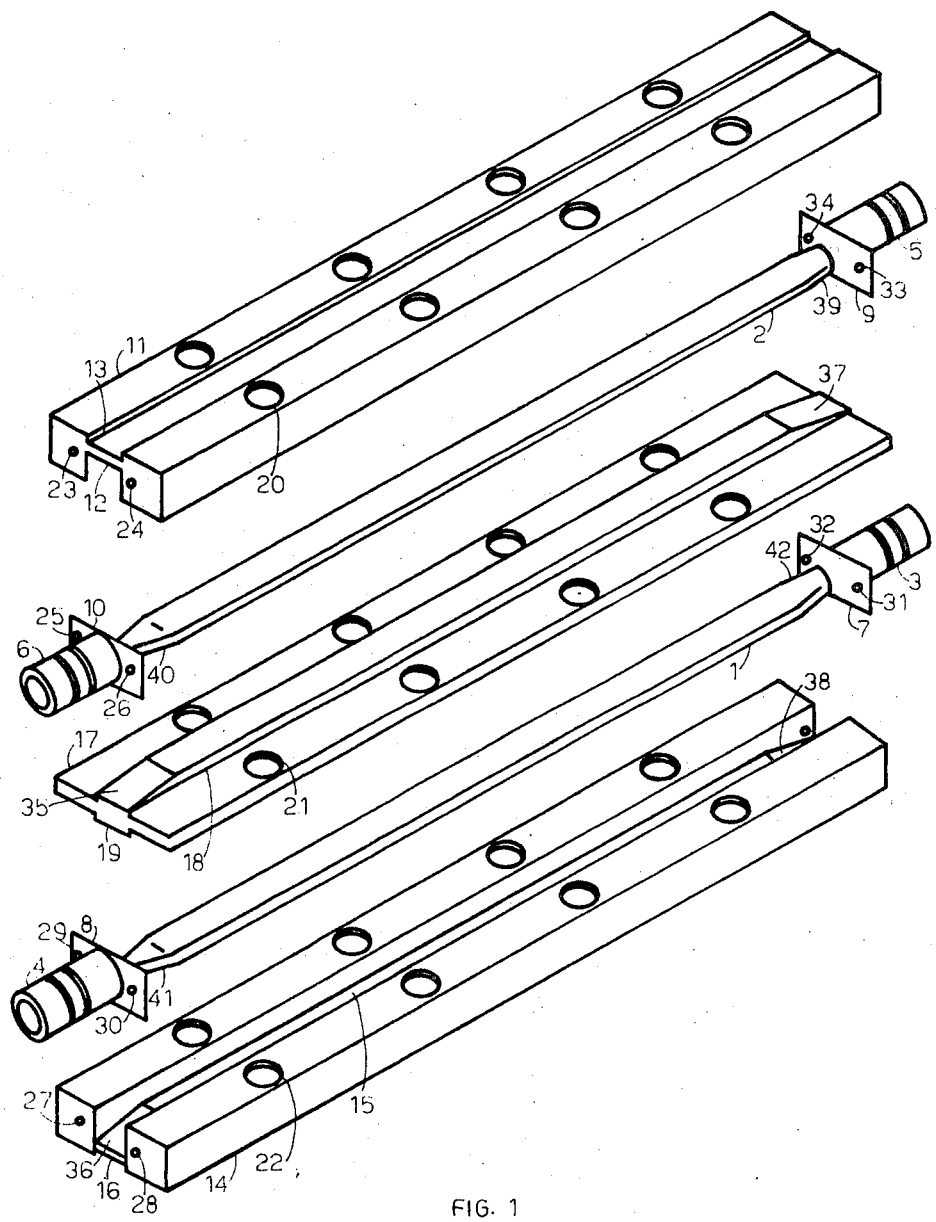
FIG. 1 is an exploded view of the significant components of the preferred form of the present invention.

The exploded view of FIG. 1 includes the significant components of the hydraulic motor of the present invention. Two high pressure hoses 1 and 2 are located between a lower shoe 14 and a floating spacer 17 and this same floating spacer 17 and an upper shoe 11. The lower hose 1 fits snugly in a channel 15 in the lower shoe 14. When the device is assembled a tongue 19 on floating spacer 17 fits in the upper part of channel 15 above hose 1 and so confines the hose on four sides. End plates 7 and 8 attached by means of suitable screws, not shown, through holes 29 and 30 into threaded holes 27 and 28 and holes 31 and 32 into similar threaded holes in the other end of lower shoe 14 confine the hose lengthwise. Hose fittings 3 and 4 provide means for attaching hydraulic lines into and out of the hose. In a similar manner upper hose 2 fits into channel 12 in upper shoe 11 and is confined therein by tongue 18 on the floating spacer. End plates 9 and 10 with mounting holes 25, 26, 33 and 34 matching screw holes 23 and 24 and similar holes at the outer end of upper shoe 11 provide the lengthwise confinement. The upper hose 2 is provided with hydraulic couplings or fittings 5 and 6. The assembly is held together, as will be described in more detail below, by suitable bolts, springs and ball bearings assembled through matching holes in the upper shoe, floating spacer and lower shoe as for example holes 20, 21 and 22.

This hydraulic motor employing high pressure hoses is intended to provide very high working pressures. The hoses, for example, are subjected to hydraulic internal pressures of the order of 5,000 pounds per square inch. A number of the important features of the present invention provide means for obtaining efficient and long operating life from a hydraulic motor employing high pressure hose. A hose which I have found to be satisfactory for my purpose is designated as high pressure hose called Synflex (Reg. TM) manufactured by Samuel Moose and Co., Mantua, Ohio and as received is 1.4375 inches O.D., round and semi-rigid, 1.00 inch I.D. Under the high operating pressures and the heat generated, the hose assumes a contoured shape determined by the operating chamber between the shoes and spacer tongues (see below). The hose is totally enclosed at all times preventing elongation or expansion beyond a predetermined position. The channels and floating spacer are provided with sloped contour changes near their ends so that the hose in making the transition from its contoured body portion to its round ends at the end fittings encounters only gradual shape changes and is free completely from sharp edges. These sloped portions are shown at 35 and 37 in the spacer tongue (the lower tongue is similar) and at 36 and 38 in the channel of the lower spacer (the channel of the upper spacer is similar). The end plates (7, 8, 9 and 10) confine the hose longitudinally preventing elongation which could progressively wear and deteriorate it.

Since the hydraulic motor of the present invention operates to provide tremendous pressures, it is important that the forces be directed solely in one direction i.e. strictly along the longitudinal median line bisecting the two shoes. The channels in the two shoes aid in this. The total enclosure of the two actuating hoses aids in this. The guided floating spacer aids in this. One further provision which also acts to insure this unidirectional force is the alignment channel 13 in the upper side of the upper shoe. The hydraulic motor is to be mounted in a work frame with a true running guide member snuggly fitted into channel 13 so that the motor cannot skew under high stress.

FIG. 2 is a simplified end view of the assembled device showing how the various parts nest and cooperate. The view is of the condition of minimum distention of the hoses i.e. the initial or rest position before force is applied. Upper shoe 11, floating spacer 17 and lower shoe 14 are assembled in accurate alignment. The upper tongue 18 fitting snuggly in channel 12 of upper shoe 11 and lower tongue 19 fitting snuggly in channel 15 of lower shoe 14 insures accurate alignment. Bolts and bearings passing through the aligned holes (as 20, 21 and 22 in FIG. 1) also insure accurate alignment as will be described more fully in connection with FIG. 3 below. When upper shoe 1 rests on spacer 17 and spacer 17 in turn rests on lower shoe 14, the cavities provided in channels 12 and 15 as modified by tongues 18 and 19 provides a predetermined space for hoses 1 and 2 in their minimum inflated positions. The cavity is further fitted by rounding of upper shoe 11 at 43 and 44, rounding of lower shoe 14 at 45 and 46, rounding of the upper lips 49 and 50 of upper tongue 18 and rounding of the lower lips 47 and 48 of the lower tongue 19 providing a contoured space for the hose. This may be designated as the first contoured condition or attitude of the hose. The fully inflated or expanded condition provides the second or maximum position contour of the hose as will be set forth in more detail below.

FIG. 3 is a composite view in which the left side is essentially the left half of the end view of FIG. 2 and the right side is partly cross-sectional and shows the device in its full work stroke position with the hoses in their second or fully expanded contour positions. In addition to the components shown and described in FIGS. 1 and 2, FIG. 3 shows assembly means in the form of a through bolt 51 having a head 52 on one end and a spanner nut 53 on the other end. This bolt is surrounded by a cylindrical ball bearing 55 and straight cylindrical sleeve 56 (shown in cross-section more fully in the right side of the Figure). Between the upper shoe 11 and the head 52 there is a return spring 54. There are a plurality of these assembly means as will be apparent from FIG. 4 described below. The return springs serve to pull up the lower shoe and floating spacer after the work stroke returning the hoses to their first or rest positions. The shoulders of floating spacer 17 act as an accurate stop between the upper and lower shoes when in the return position.

The right side of FIG. 3 shows the hydraulic motor in its fully extended work stroke position. Hoses 1 and 2 are shown in their second or fully extended contour positions. A first space is created at 57 equal to the difference between the minimum and maximum extension contour positions of hose 2 and a second space 58 is created equal to the expansion of hose 1. The lower side of lower shoe 14 has been moved downward by an amount equal to the sum of the two hose expansions or twice the expansion of one hose. The accurate cradling and contouring of the hoses and the guiding of the floating spacer have resulted in a unidirectional work force. Spring 54 has been compressed. The final position in the work stroke is predetermined by a lower stop 59 which may be a part of the set-up, die set or other load. The lower stop insures the second contour position of the hoses. Thus, the hoses work between a first or minimum expansion position and a second or maximum expansion position. The first position is chosen with two prime considerations. First, the hose must not be flattened but must be in a predetermined minimum contour so that hydraulic fluid may flow freely in or out without possibility of entrapment and the hose must not be made to bent too sharply or be placed under excess stress. Second, the hose must not be expanded beyond a predetermined contour position or become rounded at top or bottom losing pressure or move excessively in its channelized condition or be subject to excessive stresses which would be set up if the contour were not preset.

Figure 4:
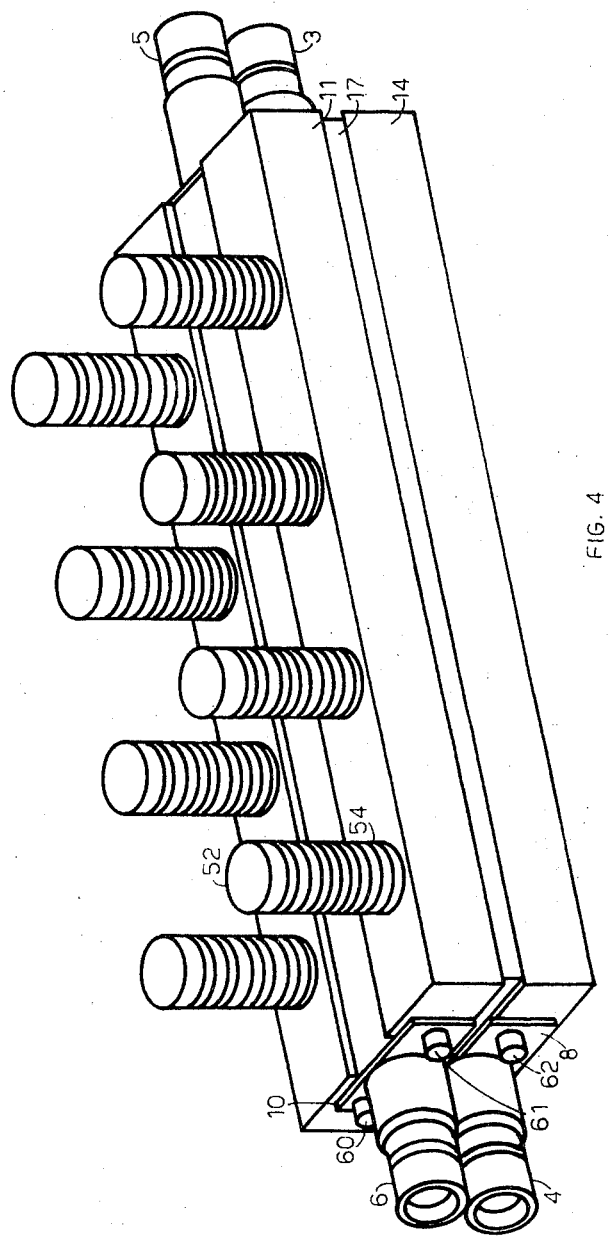
FIG. 4 is an assembly view in perspective of the hydraulic motor of the present invention.

FIG. 4 is the assembly of the hydraulic motor or module the components of which have been described in detail above. Since it is shown without the external hydraulic system coupled to the hoses, it is shown in its rest or retracted position. Springs 54 are fully extended against bolt heads 52 and upper shoe 11 rest on floating spacer 17 while spacer 17 rests on lower shoe 14. End plates 8 and 10 are shown secured to lower shoe 14 and upper shoe 11 by suitable screws 60, 61 and 62.

I claim:

1. In a hydraulic motor, the combination of;
   an upper channelled shoe comprising a heavy-walled channel iron;
   a lower channelled shoe comprising a second heavy-walled channel iron;
   means for mounting said two channel irons in spaced relationship with the respective channels therein facing each other;
   a floating spacer iron including an upper elongated tongue fitting and partially filling the channel in said upper shoe and lower elongated tongue fitting and partially filling the channel in said lower shoe for maintaining said two shoes in longitudinal alignment;
   a pair of high pressure hoses positioned one on each side of said floating spacer and within one of the channels in said upper and lower shoes for actuating the motor;
   end fittings on said hoses for conducting hydraulic fluid into one end of each of said hoses and out of the other ends;
   mounting means for securing said end fittings to said shoes for confining said hoses in their longitudinal dimensions;
   and return spring means for returning said lower shoe and spacer toward said upper shoe in the absence of substantial hydraulic pressure in said hoses.

2. A hydraulic motor as set forth in claim 1;
   wherein the inner surface of the channel in the upper shoe, and the inner surface of the lower shoe, and the two tongues are formed to provide contoured spaces between said tongues and channels in the vicinity of the ends thereof.

3. A hydraulic motor as set forth in claim 1;
   wherein said channels in said shoes and said tongues on said spacer are formed and adapted, when assembled with said hoses in place, to provide two contoured predetermined spaces for said hoses, a smaller space when said hoses are de-energized and a larger space when said hoses are under working hydraulic pressure
   and wherein said smaller space provides or the hoses to be in contoured semi-distended condition and said larger space defines the maximum distended contour permitted at the full work stroke.

4. A hydraulic motor as set forth in claim 1;
   wherein said upper and lower shoes in combination with said spacer and said end fitting mountings provide totally enclosed compartments for said hoses when the motor is both in the neutral and expanded positions.

5. A hydraulic motor as set forth in claim 1, and including:
   a plurality of bolts surrounded by cylindrical ball bushings passing through holes in said upper and lower shoes and said spacer for further aligning said shoes and spacer.

6. A hydraulic motor as set forth in claim 1, and including;
   means for limiting the maximum and minimum expansion positions of said hoses to limit the bending of the hose casings to predetermined contours.

* * * * *